(12) United States Patent
Edwards et al.

(10) Patent No.: US 12,214,461 B2
(45) Date of Patent: *Feb. 4, 2025

(54) AUTOMATED CONTAINER CUTTING SYSTEM AND METHOD

(71) Applicant: Walmart Apollo, LLC, Bentonville, AR (US)

(72) Inventors: James Benjamin Edwards, Fayetteville, AR (US); Paul Durkee, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,349

(22) Filed: Oct. 3, 2023

(65) Prior Publication Data
US 2024/0025000 A1 Jan. 25, 2024

Related U.S. Application Data

(63) Continuation of application No. 17/363,746, filed on Jun. 30, 2021, now Pat. No. 11,806,825.

(60) Provisional application No. 63/073,374, filed on Sep. 1, 2020.

(51) Int. Cl.
| | |
|---|---|
| *B23Q 15/14* | (2006.01) |
| *B23Q 17/09* | (2006.01) |
| *B25J 9/16* | (2006.01) |
| *B25J 11/00* | (2006.01) |
| *B25J 13/08* | (2006.01) |

(52) U.S. Cl.
CPC ......... *B23Q 17/0966* (2013.01); *B23Q 15/14* (2013.01); *B25J 9/1633* (2013.01); *B25J 11/0055* (2013.01); *B25J 13/085* (2013.01); *B23Q 2717/00* (2013.01)

(58) Field of Classification Search
CPC ... B23Q 17/0966; B23Q 15/14; B25J 11/0055
See application file for complete search history.

(56) References Cited

U.S. PATENT DOCUMENTS

| | | | |
|---|---|---|---|
| 7,720,567 B2 | 5/2010 | Doke et al. | |
| 8,463,428 B2 | 6/2013 | Doke et al. | |
| 9,926,094 B2 | 5/2018 | Dugat | |
| 10,664,767 B2 | 5/2020 | Takigawa et al. | |
| 11,806,825 B2 * | 11/2023 | Edwards | B23Q 17/0966 |
| 2001/0003939 A1 | 6/2001 | Liu et al. | |
| 2015/0119216 A1 | 4/2015 | Benterman et al. | |
| 2016/0026168 A1 | 1/2016 | Crystal et al. | |
| 2018/0266217 A1 * | 9/2018 | Funkhouser | E21B 21/10 |
| 2018/0326590 A1 * | 11/2018 | Masuda | B25J 15/04 |

* cited by examiner

*Primary Examiner* — Nathaniel C Chukwurah
(74) *Attorney, Agent, or Firm* — Foley IP Law, PLLC

(57) ABSTRACT

An automated container cutting system includes a cutting tool configured to cut a container and a force feedback sensor operatively connected to the cutting tool. The force feedback sensor is configured to measure resistive force exerted on the cutting tool. The automated container cutting system includes a processor communicatively coupled to the force feedback sensor. The processor is configured to receive resistive force data from the force feedback sensor and determine whether the cutting tool has penetrated through the wall of the container using the received resistive force data.

20 Claims, 7 Drawing Sheets

AUTOMATED CONTAINER CUTTING SYSTEM AND METHOD

This application is a continuation of U.S. patent application Ser. No. 17/363,746, filed Jun. 30, 2021, entitled "AUTOMATED CONTAINER CUTTING SYSTEM AND METHOD", which claims the benefit of priority of U.S. Provisional Application No. 63/073,374, filed Sep. 1, 2020, entitled "AUTOMATED CONTAINER CUTTING SYSTEM AND METHOD", each of which is incorporated herein in its entirety.

BACKGROUND

Automated container cutting systems are known for use in opening containers (i.e., cases, boxes, cartons, etc.). However, at least some known automated container cutting systems may inaccurately cut some types of containers. For example, cutting blades of known automated container cutting systems may penetrate too deep and thereby damage one or more items contained within a container. Alternatively, the cutting blades of known automated container cutting systems may insufficiently penetrate through the thickness of a wall of a container, such that the cut does not enable the container to be opened. Moreover, known automated container cutting systems may inaccurately cut containers that have been deformed (e.g., from handling, storage, etc.) from the original size and/or shape of the container. In another example, tape protruding from an exterior side of a container and/or one or more other irregularities may cause known automated container cutting systems to misinterpret the exterior boundaries of, and thereby inaccurately cut containers.

SUMMARY

In one aspect, an automated container cutting system for cutting a container includes a cutting platform and a cutting tool held by the cutting platform. The cutting tool is configured to cut the container. The automated container cutting system includes a force feedback sensor operatively connected to the cutting tool such that the force feedback sensor is configured to measure resistive force exerted on the cutting tool. The automated container cutting system includes at least one processor communicatively coupled to the force feedback sensor. The processor is configured to receive resistive force data from the force feedback sensor. The resistive force data represents resistive force exerted on the cutting tool as the cutting tool pierces a wall of the container. The at least one processor is configured to determine whether the cutting tool has penetrated through the wall of the container using the received resistive force data.

In another aspect, a computer implemented method is provided for automated cutting of containers. The method includes implementing, by at least one processor, the following operations: tracking results of cuts to a plurality of containers of a first container type; and establishing and/or adjusting a programmed cutting depth of a cutting tool for the first container type based on the tracked results.

In another aspect, an apparatus is provided for cutting a container. The apparatus includes a cutting platform and a cutting tool held by the cutting platform. The cutting tool is configured to cut the container. The apparatus includes a force feedback sensor operatively connected to the cutting tool such that the force feedback sensor is configured to measure resistive force exerted on the cutting tool. The force feedback sensor is configured to be communicatively coupled to a processor, wherein the processor receives resistive force data from the force feedback sensor that represents resistive force exerted on the cutting tool as the cutting tool pierces a wall of the container and determines whether the cutting tool has penetrated through the wall of the container using the received resistive force data.

DETAILED DESCRIPTION

Figure 1:
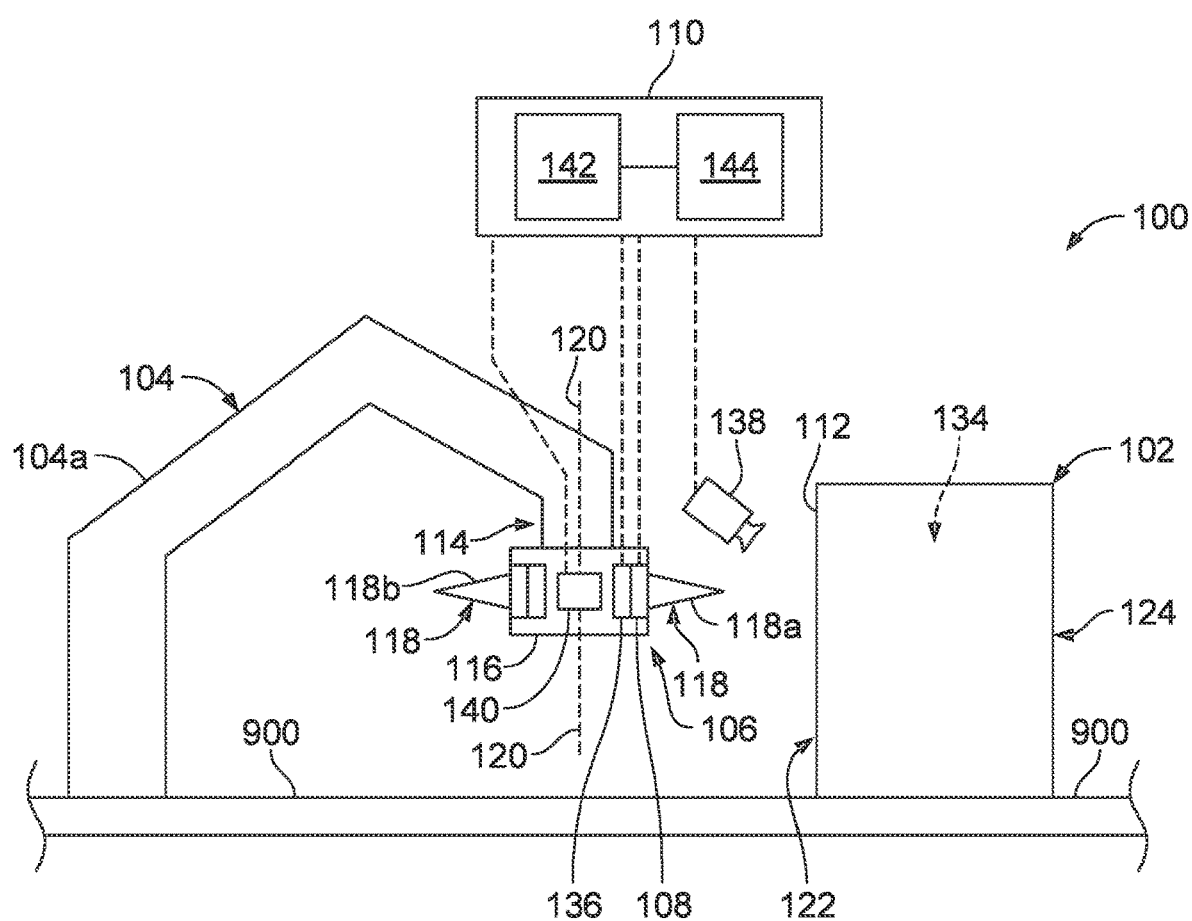
FIG. 1 is a schematic diagram of an automated container cutting system according to an implementation.

Automated container cutting systems are known for use in opening a plurality of containers (i.e., cases, boxes, cartons, etc.) using cutting blades mounted on a cutting platform (e.g., an articulated robot arm, a press, a gantry, a post, etc.). The cutting blades of some known automated container cutting systems are configured to open containers by penetrating a predetermined fixed distance (i.e., cutting depth) into the container (e.g., from an exterior side of the container, etc.). But, the thickness of the material (e.g., cardboard, etc.) of the container may vary for different types (e.g., sizes, shapes, strengths, etc.) of containers, for example depending on the structural strength requirements dictated by the particular product(s) contained therein, etc. Accordingly, the fixed distance may cause the automated container cutting system to inaccurately cut some types of containers For example, the fixed distance may be greater than the material thickness of some containers, which may result in the cutting blade penetrating too deep and possibly damaging one or more items contained therein. For other containers, the fixed distance may be less than the material thickness of the container, which may prevent the cutting blade from penetrating a sufficient distance through the thickness of the material that enables the container to be opened.

Some known automated container cutting systems are programmed to penetrate a different predetermined fixed distance for each different type of container being cut by the system. But, separately programming different fixed distances for different types of containers may be time consuming and/or labor intensive, which may reduce the efficiency and/or cost-effectiveness of the automated container cutting system. Moreover, the cutting blade may not accurately cut containers of the same type despite being programmed with the same fixed distance. For example, known automated container cutting systems may inaccurately cut containers that have been deformed (e.g., from handling, storage, etc.) from the original size and/or shape of the container. In another example, tape protruding from an exterior side of a container and/or one or more other irregularities may cause known automated container cutting systems to misinterpret the exterior boundaries of, and thereby inaccurately cut, the container.

The examples disclosed herein provide an electronic device that automatically determines whether a cutting tool has penetrated through a wall of a container using resistive force data measured by a force feedback sensor operatively connected to the cutting tool. The determinations made by the electronic device enable an automated container cutting system to successfully cut a plurality containers while reducing or preventing damage to items contained within the containers. The determinations made by the electronic device also enable the automated container cutting system to cut containers that do not have pre-existing (i.e., established, predetermined, etc.) programmed cutting depths. Moreover, the determinations made by the electronic device enable an automated container cutting system to cut containers that have been deformed (e.g., from handling, storage, etc.) from the original size and/or shape of the container. The determinations made by the electronic device thus improve the accuracy, efficiency, and/or the like of automated container cutting systems.

In other examples disclosed herein, the electronic device automatically tracks the results of cuts to a plurality of containers made by an automated container cutting system, for example cuts to a plurality of the same type of containers. The electronic device may use the tracked results to automatically establish programmed cutting depths for container types that do not have existing programmed cutting depths. The electronic device may also use the tracked results to automatically adjust the programmed cutting depths of container types having established (e.g., existing, etc.) programmed cutting depths. The electronic device may thus increase the efficiency and/or lower the operational costs of automated container cutting systems. For example, the electronic device may use the tracked results to project a future expected sharpness, a maintenance schedule, and/or a lifespan of a cutting tool, which may reduce the operational downtime and/or reduce or eliminate scheduled maintenance checks of automated container cutting systems.

Certain implementations of the present disclosure provide an automated container cutting system for cutting a container includes a cutting platform and a cutting tool held by the cutting platform. The cutting tool is configured to cut the container. The automated container cutting system includes a force feedback sensor operatively connected to the cutting tool such that the force feedback sensor is configured to measure resistive force exerted on the cutting tool. The automated container cutting system includes at least one processor communicatively coupled to the force feedback sensor. The processor is configured to receive resistive force data from the force feedback sensor. The resistive force data represents resistive force exerted on the cutting tool as the cutting tool pierces a wall of the container. The at least one processor is configured to determine whether the cutting tool has penetrated through the wall of the container using the received resistive force data.

Certain implementations of the present disclosure provide a computer implemented method for automated cutting of containers. The method includes implementing, by at least one processor, the following operations: tracking results of cuts to a plurality of containers of a first container type; and establishing and/or adjusting a programmed cutting depth of a cutting tool for the first container type based on the tracked results.

Certain implementations of the present disclosure provide an apparatus for cutting a container. The apparatus includes a cutting platform and a cutting tool held by the cutting platform. The cutting tool is configured to cut the container. The apparatus includes a force feedback sensor operatively connected to the cutting tool such that the force feedback sensor is configured to measure resistive force exerted on the cutting tool. The force feedback sensor is configured to be communicatively coupled to a processor, wherein the processor receives resistive force data from the force feedback sensor that represents resistive force exerted on the cutting tool as the cutting tool pierces a wall of the container and determines whether the cutting tool has penetrated through the wall of the container using the received resistive force data.

Certain implementations of the present disclosure operate in an unconventional manner to automatically determine whether a cutting tool has penetrated through a wall of a container. Certain implementations of the present disclosure enable an automated container cutting system to successfully cut a plurality containers (e.g., cut through the entire thickness of a wall of the containers, etc.) while reducing or preventing damage to items contained within the containers. Certain implementations of the present disclosure enable an automated container cutting system to cut a container that does not have a pre-existing (i.e., established, predetermined, etc.) programmed cutting depth. Certain implementations of the present disclosure enable an automated container cutting system to cut containers that have been deformed (e.g., from handling, storage, etc.) from the original size and/or shape of the container. Accordingly, certain implementations of the present disclosure improve the accuracy, efficiency, and/or the like of automated container cutting systems.

Certain implementations of the present disclosure automatically track the results of cuts to a plurality of containers, for example cuts to a plurality of containers of the same type. Certain implementations of the present disclosure automatically establish programmed cutting depths for container types that do not have existing programmed cutting depths. Certain implementations of the present disclosure automatically adjust the programmed cutting depths of container types having established (e.g., existing, etc.) programmed cutting depths. Accordingly, certain implementations of the present disclosure increase the efficiency and/or lower the operational costs of automated container cutting systems.

Certain implementations of the present disclosure enable: (1) the projection of a future expected sharpness of a cutting tool; (2) the projection of a maintenance schedule for a cutting tool; and/or (3) the projection of a life span of a cutting tool. Accordingly, certain implementations of the present disclosure reduce the operational downtime of automated container cutting systems. Moreover, and for example, certain implementations of the present disclosure reduce or eliminate scheduled maintenance checks of automated container cutting system.

FIG. 1 is a schematic diagram of an implementation of an automated container cutting system 100 for cutting a plurality of containers (e.g., the container 102, etc.). The automated container cutting system 100 includes a cutting platform 104, a cutting tool 106, a force feedback sensor 108, and an electronic device 110. The cutting platform 104 and the container 102 are shown in FIG. 1 as resting on a work surface 900 of the system 100 and/or the environment within which the system 100 is implemented. As will be described in more detail below, the electronic device 110 is configured to determine whether the cutting tool 106 has penetrated through a wall (e.g., the wall 112 of the container 102, etc.) of a container using resistive force data received from the force feedback sensor 108. In some implementations, and as will also be described in more detail below, the electronic device 110 is configured to track the results of cuts to a plurality of containers of the same type and establish and/or adjust a programmed cutting depth of the cutting tool 106 for the particular type of container based on the tracked results.

The automated container cutting system 100 may be used to cut the containers in any environment and for any purpose. For example, the system 100 may be used to make cuts into the containers to open the containers and/or enable the containers to be opened by another automated system and/or a human operator (e.g., for sale, repackaging, and/or use of items contained therein; for processing returned items; for replenishment of stock in order picking operations and/or points of sale; etc.). Examples of environments within which the system 100 may be used include, but are not limited to, retail environments, wholesale environments, distribution centers, warehouses, co-packing operations, and/or the like.

Each of the containers cut by the automated container cutting system 100 may have any size, shape, wall thickness, and/or other geometry; may include and/or be fabricated from any material(s); and/or may contain any type and number of items therein. Examples of materials included by the containers and/or from which the containers are fabricated include, but are not limited to, cardboard, paper, plastic, corrugated materials, non-corrugated materials, and/or the like. In some implementations, the automated container cutting system 100 is configured to cut containers: having a variety of different sizes, shapes, wall thicknesses, and/or other geometries; fabricated from a variety of different materials; containing different types and/or numbers of items, and/or the like. As used herein, a "type" of container (also referred to herein as a "container type") includes containers: having approximately the same original (e.g., before handling, storages, etc.) size, shape, wall thickness, other geometry, material composition, and/or the like; containing the same number and/or type of items; and/or the like.

The automated container cutting system 100 may be used within a larger system (not shown) that includes infrastructure (not shown) that routes containers to be cut to the automated container cutting system 100. In other words, the automated container cutting system 100 may be a subsystem of the larger system (e.g., the system 100 is one cutting station of a larger system that includes a plurality of cutting stations, etc.). Examples of infrastructure used to route containers to the automated container cutting system 100 include, but are not limited to, conveyor systems (e.g., belt conveyors, roller conveyors, overhead conveyors, etc.), rail systems, trolley systems, track systems, mobile robots, automated vehicles, remote control vehicles, human operators, scanners, and/or the like. In some implementations, the electronic device 110 at least partially controls the operations of routing containers to the automated container cutting system 100. For example, the electronic device 110 may be a controller and/or other electronic device of the larger system that, in addition to controlling at least some of the routing operations of containers to the system 100, controls the routing of containers to other stations (e.g., other cutting stations, unpacking stations, storage stations, distribution stations, etc.) of the larger system and/or controls other operations of the larger system. In another example, the electronic device 110 is dedicated to the automated container cutting system 100 and controls at least some of the operations that route containers to the system 100.

The automated container cutting system 100 may include one or more components (not shown) that facilitate positioning (e.g., aligning, orienting, locating, etc.) and/or holding containers at the system 100 (e.g., relative to the cutting platform 104, etc.) such that the containers are secured in a position that enables the cutting tool 106 of the system 100 to cut the containers. Examples of components that facilitate positioning and holding containers at the automated container cutting system 100 include, but are not limited to, rails, guides, optical sensors, cameras, fixtures, clamps, and/or the like. In some implementations, the electronic device 110 at least partially controls the operations of positioning and/or holding containers at the automated container cutting system 100. For example, in some implementations the electronic device 110 is dedicated to the automated container cutting system 100 and controls at least some of the positioning and/or holding operations of containers at the system 100. In another example, in addition to controlling at least some of the positioning and/or holding operations of containers at the system 100, in some implementations the electronic device 110 is a controller and/or other electronic device of a larger system that controls the positioning and/or holding operations of other stations (e.g., other cutting stations, unpacking stations, storage stations, distribution stations, etc.) of the larger system and/or controls other operations of the larger system.

In the implementations shown herein, the cutting platform 104 is an articulated robot arm 104*a* that is configured to hold the cutting tool 106, for example on an end portion 114 of the articulated robot arm 104*a*, as is shown in FIG. 1. The articulated robot arm 104*a* may be any type of articulated robot arm 104*a* that enables the automated container cutting system 100 to function as described and/or illustrated herein. For example, the articulated robot arm 104*a* may be configured to move (e.g., translate, rotate, etc.) about any number of axes (two axes, three axes, four axes, six axes, eight axes, etc.). In the exemplary implementation, the articulated robot arm 104*a* is a 6-axis arm that is configured to move about six independent axes. One specific example of the articulated robot arm 104*a* is a Selective Compliance Assembly Robot Arm (SCARA).

The cutting platform 104 is not limited to the articulated robot arm 104*a*. Rather, the cutting platform 104 additionally or alternatively includes any other type of automated cutting platform, such as, but not limited to, a press, a fixture and/or other support structure (e.g., a hanging structure, a structure that rests on and/or is attached to a floor, etc.), a gantry-style platform, a post-style platform, a Computerized Numerical Control (CNC) machine, a commercially available robot, a custom-built device, and/or the like. The cutting platform 104 may be powered by any suitable power source, such as, but not limited to, an electrical power source (e.g., a battery, an electrical power grid, an electrical generator, etc.), a pneumatic power source, a hydraulic power source, and/or the like.

The cutting tool 106 includes a base 116 and one or more cutters 118. The base 116 of the cutting tool 106 is configured to be held by the cutting platform 104 such that the cutter(s) 118 are configured to function as described and/or illustrated herein (e.g., to cut the containers along a cutting path, etc.). Each cutter 118 may be configured to cut any materials, structures, patterns, and/or the like (e.g., cardboard, paper, plastic, corrugated materials, non-corrugated materials, regular slotted carton (RSC) boxes including corrugated cardboard, seams, hot melt glue seals, tape, other materials associated with containers, creating lines and/or other patterns of perforations and/or scores, cutting into existing lines and/or other patterns of perforations and/or scores, etc.). Although two are shown, the cutting tool 106 may include any number of cutters 118. In the exemplary implementation, each cutter 118 of the cutting tool 106 is a blade, but the cutting tool 106 additionally or alternatively may include any other type of cutter that enables the cutting tool 106 to function as described and/or illustrated herein. Each blade of the cutter 118 may include any type of blade, such as, but not limited to, straight tip blades, round tip blades, and/or the like. In the exemplary implementation, the cutters 118 are configured to cut the containers by slicing the containers as the drilling platform moves the cutting tool 106 along the container. In addition or alternative to slicing the containers, one or more of the cutters 118 may be configured to passively and/or actively rotate about an axis of rotation (not shown; e.g., free to rotate passively similar to a pizza cutter and/or actively driven similar to a circular saw, etc.) to facilitate making cuts into the containers.

In some implementations, the cutting platform 104 is configured to interchangeably hold different cutting tools 106. For example, the cutting platform 104 may include a hub (e.g., at the end portion 114 of the articulated robot arm 104a, etc.) that is configured to releasably hold cutting tools 106 such that different cutting tools 106 are interchangeable on the cutting platform 104 (e.g., can be selectively secured to and removed from the cutting platform 104, etc.). In one exemplary implementation, a hub used to interchangeably hold different cutting tools 106 is a quick-change hub (e.g., a magnetic coupling, a bayonet connection, a plug-in connection, etc.) that enables different cutting tools 106 to be relatively quickly and easily interchanged (e.g., swapped out, etc.). Optionally, the cutting tool 106 is configured to interchangeably hold different cutters 118 (e.g., the cutting tool 106 is configured to releasably hold cutters 118 such that different cutters 118 are interchangeable on the cutting tool 106, the cutting tool incudes a quick-change hub, etc.).

In some implementations, the cutting platform 104 includes a fixture (not shown) that is capable of simultaneously holding a plurality of cutting tools 106 and is configured to move (e.g., rotate, slide or otherwise move linearly, etc.) to enable the cutting platform 104 to interchange between the different cutting tools 106 held thereon (e.g. cycle between the use of the different cutting tools 106, etc.). Moreover, in some implementations the orientation and/or position of the cutting tool 106 relative to the container can be changed to interchange between the use of different cutters 118 held by the cutting tool 106. For example, the cutting tool 106 shown in FIG. 1 may be rotatable about an axis of rotation 120 to change the orientation of the cutting tool 106 relative to the container 102 and thereby interchange between the use of cutters 118a and 118b of the cutting tool 106. In another example, the cutting tool 106 can be moved from the position on a side 122 of the container 102 to a position on a different side (e.g., the side 124 shown in FIG. 1, etc.) of the container 102 to interchange between the use of the cutters 118a and 118b.

The interchangeability of different cutting tools 106 on the cutting platform 104 and/or different cutters 118 on a cutting tool 106 enables cutting tools 106 and cutters 118 of the same type (e.g., for cutting containers of the same type; for performing the same type of cuts; for cutting the same materials, structures, patterns, and/or the like; etc.) to be interchanged, for example for replacing a cutting tool 106 and/or cutter 118 that has been damaged, worn, and/or otherwise rendered less functional, etc. The interchangeability of different cutting tools 106 on the cutting platform 104 and/or different cutters 118 on a cutting tool 106 also enables cutting tools 106 and cutters 118 of different types to be interchanged (e.g., for cutting a different type of container; for cutting into a different pattern, material, structure and/or the like; for creating a different pattern and/or the like; etc.).

In operation, the cutting platform 104 moves the cutting tool 106 relative to the container 102 to perform programmed cuts, slits, scores, perforations, and/or the like. The electronic device 110 and/or another electronic device (not shown, e.g., a controller of the cutting platform 104, etc.) controls the cutting operations performed by the automated container cutting system 100. Optionally, the automated container cutting system 100 and/or a larger system within which the system 100 is implemented includes one or more sensors (not shown; e.g., optical sensors, etc.) configured to determine the dimensions of a particular container to be cut. Dimensional information obtained by the sensor(s) is conveyed to the electronic device(s) that control the cutting operations to facilitate performing the programmed cutting operations at the intended location(s) on the container.

As briefly described above, the automated container cutting system 100 includes the force feedback sensor 108. The force feedback sensor 108 is operatively connected to the cutting tool 106 such that the force feedback sensor 108 is configured to measure resistive force exerted on the cutter 118 of the cutting tool 106. The measurements of the force feedback sensor 108 generate resistive force data that represents resistive force exerted on the cutter 118 of the cutting tool 106 as the cutter 118 pierces a wall (e.g., the wall 112, etc.) of a container (e.g., the container 102, etc.). The resistive force data includes at least one measurement of the resistive force exerted on the cutter 118 that is taken as the cutter 118 moves through the thickness of the container wall. The resistive force data may include at least one measurement of the resistive force exerted on the cutter 118 that is taken as the cutter 118 pierces at least one location along the thickness of the wall of the container. For example, the resistive force data may include at least one measurement of the resistive force exerted on the cutter 118 that is taken as the cutter 118 pierces an interior side of the container wall. In some implementations, the resistive force data includes measurements of the resistive force exerted on the cutter 118 that are taken as the cutter pierces a plurality of various locations along the thickness of the container wall, for example as the cutter 118 pierces an exterior side of the container wall, as the cutter 118 pierces an interior side of the container wall, as the cutter 118 pierces an internal structure (e.g., corrugation, etc.) of the wall, etc. The resistive force data may include one or more measurements of the resistive force exerted on the cutter 118 at any other location along the thickness of the container wall. In some implementations, the force feedback sensor 108 is configured to continually measure the resistive force exerted on the cutter 118 as the cutter 118 moves through the thickness of the container wall. In other implementations, the force feedback sensor is configured to measure the resistive force exerted on the cutter 118 at predetermined intervals as the cutter 118 moves through the thickness of the container wall.

For example, FIGS. 2a-d illustrates an exemplary implementation of movement of the cutter 118 of the cutting tool 106 through the thickness T of the wall 112 of the container 102 during a cutting operation of the automated container cutting system 100. In FIG. 2a, the cutter 118 of the cutting tool 106 moves in the direction of the arrow 126 toward the wall 112 and an interior 134 of the container 102. FIG. 2b illustrates the cutter 118 as having moved in the direction 126 from the position shown in FIG. 2a into physical contact with an exterior side 128 of the container wall 112. In FIG. 2c, the cutter 118 has moved further in the direction 126 such that the cutter 118 has pierced the exterior side 128 of the container wall 112 but has not yet contacted an interior side 130 of the container wall 112. FIG. 2d illustrates the cutter 118 as having moved further in the direction 126 such that the cutter 118 has pierced the interior side 130 of the container wall 112. In the position shown in FIG. 2d, the cutter 118 has penetrated through the container wall 112. In other words, the cutter 118 has penetrated the entire thickness T of the container wall 112. For example, the cutter 118 has moved in the direction 126 through the entire thickness T of the container wall 112 such that at least a tip 132 of the cutter 118 extends (e.g., protrudes, projects, etc.) outwardly from the interior side 130 in the direction 126 (i.e., at least the tip 132 has moved in the direction 126 past the interior side 130).

In some implementations, the resistive force data includes a resistive force trace composed of a plurality of measurements of the resistive force exerted on the cutter 118 of the cutting tool 106 as the cutter moves toward, through, and/or past the thickness of the container wall. The resistive force trace may be compiled by the force feedback sensor 108 and transmitted to the electronic device 110, or the electronic device 110 may compile the resistive force trace from measurements of resistive force received from the force feedback sensor 108. In some examples, the resistive force trace is compiled from continuous measurement of the resistive force exerted on the cutter 118 as the cutter 118 moves through the thickness of the container wall. In other examples, the resistive force trace is compiled from a plurality of discrete measurements of the resistive force exerted on the cutter 118 as the cutter 118 moves through the thickness of the container wall (e.g., measurements taken at predetermined intervals, measurements taken at predetermined locations along the thickness of the container wall, etc.).

Figure 2:
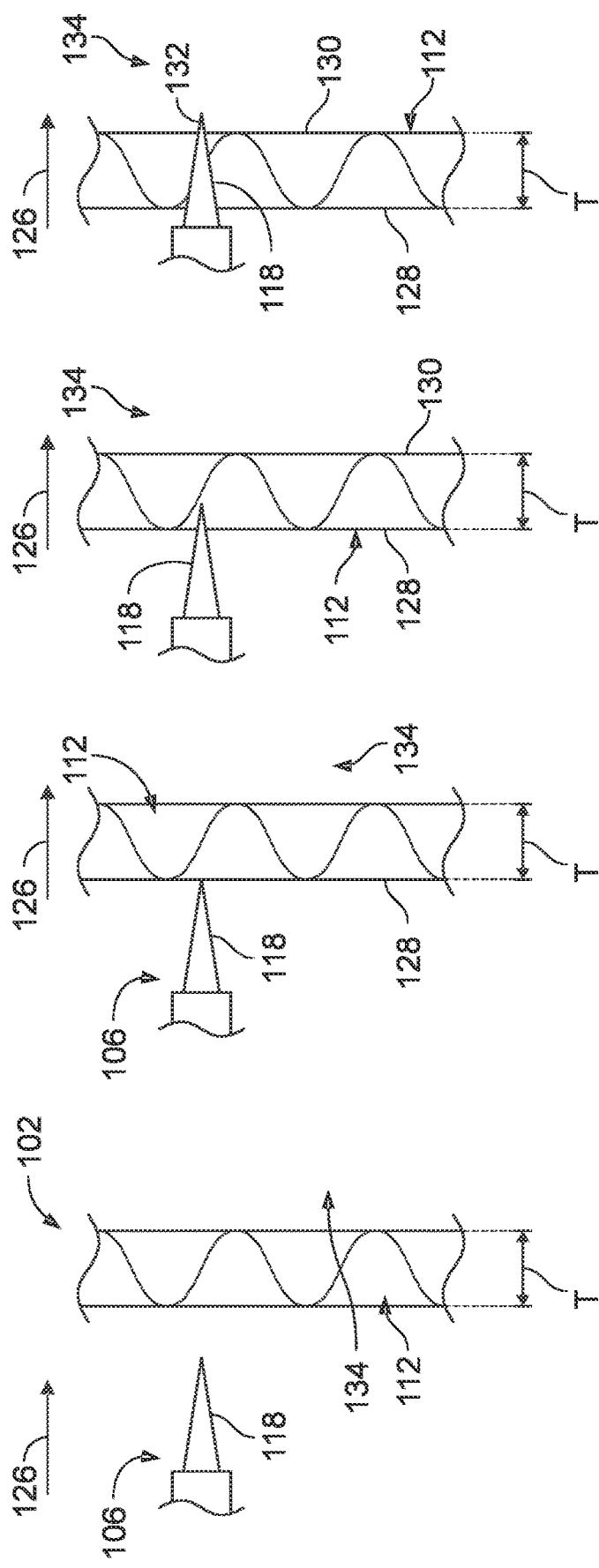
FIGS. 2a-2d illustrate movement of a cutting tool of the automated container cutting system shown in FIG. 1 through the thickness of a wall of a container according to an implementation.
Figure 3:
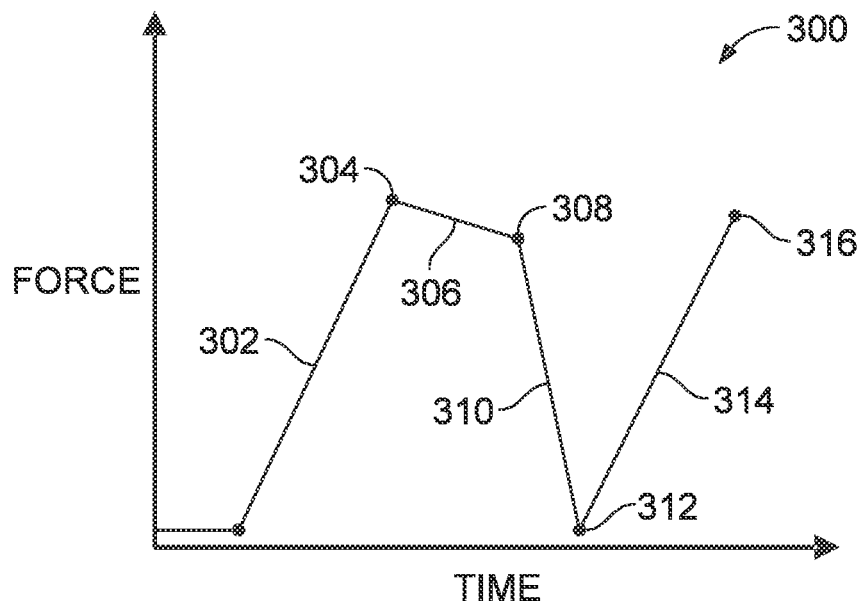
FIG. 3 is graph illustrating an example of a resistive force trace according to an implementation.

FIG. 3 illustrates one example of a resistive force trace 300 of the resistive force data measured by the force feedback sensor 108. Referring now to FIGS. 2 and 3, the resistive force exerted on the cutter 118 increases as the cutter 118 moves into the position shown in FIG. 2b wherein the cutter 118 is in physical contact with, and applies force in the direction 126 to the exterior side 128 of the container wall 112, as shown by line 302 of the resistive force trace 300. The resistive force exerted on the cutter 118 peaks at point 304, which represent the point in time just prior to the cutter 118 piercing the exterior side 128. After piercing the exterior side 128 of the container wall 112, the resistive force exerted on the cutter 118 decreases as the cutter 118 moves through the thickness T of the container wall 112 toward the interior side 130 of the container wall 112, as illustrated by line 306 of the resistive force trace 300. Point 308 of the resistive force trace 300 represents the point in time just prior to the cutter 118 piercing the interior side 130 of the container wall 112. As shown by line 310 of the resistive force trace 300, the resistive force exerted on the cutter 118 decreases further, and at a faster rate, after the cutter 118 has pierced the interior side 130 of the container wall 112. In other words, the resistive force exerted on the cutter 118 decreases after the cutter 118 has moved from the position shown in FIG. 2c to the position shown in FIG. 2d wherein the cutter 118 has pierced the interior side 130 of the container wall 112. Point 308 can thus be used as a force change point within the resistive force trace 300 that indicates that the cutter 118 has pierced the interior side 130 of the container wall 112. Similarly, point 304 of the resistive force trace 300 can be used as a force change point within the resistive force trace 300 that indicates that the cutter 118 has pierced the exterior side 128 of the container wall 112.

In the example of FIG. 3, the resistive force trace 300 includes a line 314 that illustrates an increase in the resistive force exerted on the cutter 118 in the event that the cutter 118 moves sufficiently far in the direction 126 to physically contact an item contained within the interior 134 the container 102. Line 314 and/or a peak 316 of line 314 can thus be used as an indication that the cutter 118 has physically contacted one or more items contained within the container 102. In other examples, the resistive force trace 300 does not include the line 314 and the point 312 (i.e., the trough of the line 310) indicates the point in time wherein movement of the cutter 118 in the direction 126 has been stopped. Moreover, other examples of the resistive force trace 300 may include a line (not shown; e.g., extending from the point 312, extending from the point 316, etc.) that indicates a force exerted on the cutter 118 in an opposite direction to the resistive force as the cutter 118 is retracted back through the thickness T of the container wall 112 (e.g., moved in a direction opposite the direction 126, etc.). (PLEASE INDICATE WHETHER THIS PARAGRAPH IS ACCURATE.)

The resistive force trace 300 shown in FIG. 3 is meant only as one example of a resistive force trace 300 of the automated container cutting system 100. Other examples and implementations of the automated container cutting system 100 may include a resistive force trace having any other profile, shape, geometry, rate of force decrease of lines 306 and/or 310, location of the force change points 308 and/or 304, and/or the like.

Referring again to FIG. 1, the force feedback sensor 108 includes any type(s) and number of sensors that enable the force feedback sensor 108 to function as described and/or illustrated herein (e.g., to measure resistive force on exerted on the cutter 118 of the cutting tool 106 as the cutter 118 pierces a wall of the container, generate resistive force data, etc.). Examples of the force feedback sensor 108 include, but are not limited to, analog sensors, mechanical sensors, electronic sensors, digital sensors, strain gauges, pressure sensors, potentiometers, piezoelectric sensors, piezoresistive strain gauges, resistive sensors, force-sensing resistors, capacitive sensors, electromagnetic sensors, potentiometric sensors, load cells, and/or the like. The force feedback sensor 108 may be operatively connected directly to the cutter 118 of the cutting tool 106 for measuring resistive force exerted on the cutter 118. In addition, or alternatively, the force feedback sensor 108 is operatively connected to another structure, location, component, and/or the like of the cutting tool 106 (e.g., the base 116, etc.) for measuring resistive force exerted on the cutter 118.

In some implementations, the automated container cutting system 100 includes a torque sensor 136. The torque sensor 136 is operatively connected to the cutting tool 106 such that the torque sensor 136 is configured to measure torque exerted on the cutter 118 of the cutting tool 106. The measurements of the torque sensor 136 generate torque data that represents torque exerted on the cutter 118 of the cutting tool 106 as the cutter 118 cuts a wall (e.g., the wall 112, etc.) of a container (e.g., the container 102, etc.). Optionally, the torque data includes a torque trace composed of a plurality of measurements of the torque exerted on the cutter 118 of the cutting tool 106 as the cutter moves toward, through, and/or past the thickness of the container wall.

The torque sensor 136 includes any type(s) and number of sensors that enable the torque sensor 136 to function as described and/or illustrated herein (e.g., to measure torque exerted on the cutter 118 of the cutting tool 106 as the cutter 118 cuts a wall of the container, generate torque data, etc.). Examples of the torque sensor 136 include, but are not limited to, analog sensors, mechanical sensors, electronic sensors, digital sensors, strain gauges, rotary torque sensors, reaction torque sensors, micro reaction torque sensors, load cells, and/or the like. The torque sensor 136 may be operatively connected directly to the cutter 118 of the cutting tool 106 for measuring torque exerted on the cutter 118. In addition, or alternatively, the torque sensor 136 is operatively connected to another structure, location, component, and/or the like of the cutting tool 106 (e.g., the base 116, etc.) for measuring torque exerted on the cutter 118.

In some implementations, the automated container cutting system 100 includes one or more cameras 138 positioned on or near the system 100 (e.g., on the cutting platform 104, over or next to the container, etc.). Each camera 138 is configured to acquire images of an area that includes a container being cut by the automated container cutting system 100. As will be described below, the camera(s) 138 may be used to determine whether any items contained within the containers have been damaged by the cutter 118 of the cutting tool 106, determine whether a cut has been successful (e.g., whether the cutter 118 has cut completely through the thickness of the container wall along an approximate entirety of the intended cutting path, whether the cut opens the container or enables the container to be opened, etc.), determine whether a cut has failed (e.g., whether the cutter 118 has only cut through a portion of the thickness of the container wall, whether the cut does not open the container or enable the container to be opened, etc.), and/or the like.

Each camera 138 is configured to acquire any type(s) of image, such as, but not limited to, still images, video images, real-time images, delayed images, visible light images, night vision images, and/or like. For example, in one exemplary implementation, one or more cameras 138 is configured to acquire real-time video of the area that includes the container being cut by the system 100. Each camera 138 is any type of camera that enables the camera 138 to function as described and/or illustrated herein (e.g., to acquire images of an area that includes a container being cut by the system 100, etc.). Examples of the camera 138 include, but are not limited to, a still image camera, a video camera, a digital camera, a night vision camera, a visible light camera, a lipstick camera, and/or the like. The automated container cutting system 100 may include any number of cameras 138.

Optionally, the automated container cutting system 100 includes a following mechanism 140 operatively connected to the cutting tool 106. The following mechanism 140 is configured to facilitate maintaining engagement of the cutter 118 of the cutting tool 106 in physical contact with the container wall as the cutter 118 cuts the wall. For example, as the cutter 118 cuts a container, the cutter 118 may disengage from a container wall that has been deformed (e.g., from handling, storage, etc.) from its original size and/or shape. In other words, the cutting path of the cutter 118 may deviate from a surface of a container wall that has been deformed (e.g., warped, etc.) from its original size and/or shape. When the wall of a container is deformed, the following mechanism 140 is configured to move and/or bias the cutter 118 to maintain physical contact of the cutter 118 with the container wall and thereby facilitate enabling the cutter to cut the container along the intended cutting path. The following mechanism 140 may include any structure, means, mechanism, device, and/or the like that enables the following mechanism to function as described and/or illustrated herein, such as, but not limited to, a spring, a linear actuator, a damper, and/or the like.

Referring now to the electronic device 110, the electronic device 110 includes one or more processors 142 and one or more optional memories 144. As will be described below, the electronic device 110 is configured to execute the methods described herein with respect to FIGS. 4-7 for automated cutting of a container. For example, some implementations of the electronic device 110 receive resistive force data (e.g., the resistive force trace 300 shown in FIG. 3, etc.) from the force feedback sensor 108 and determine whether the cutting tool 106 has penetrated through a wall (e.g., the wall 112 of the container 102, etc.) using the received resistive force data. Moreover, and for example, some implementations of the electronic device 110 track the results of cuts to a plurality of containers of the same type and, based on the tracked results, establish and/or adjust a programmed cutting depth of the cutting tool 106 for the particular type of container.

The electronic device 110 represents any device executing instructions (e.g., as application programs/software, operating system functionality, or both) to implement the operations and functionality associated with the electronic device 110. In some implementations, the electronic device 110 includes a mobile electronic device or any other portable device, for example a mobile telephone, laptop, tablet, computing pad, netbook, and/or the like. In some implementations, the electronic device 110 includes less portable devices, for example desktop personal computers, servers, controllers, kiosks, tabletop devices, industrial control devices, and/or the like. The electronic device 110 represents a group of processing units, servers, other computing devices, and/or the like in some implementations.

In some implementations, the electronic device 110 is located onboard the cutting platform 104, while in other implementations the electronic device 110 is located off-board the cutting platform (e.g., at the site of a larger system within which the automated container cutting system 100 is implemented, at a site remote from the automated container cutting system 100 and/or a larger system within which the system 100 is implemented, etc.). In some implementations, the electronic device 110 is a controller that controls the cutting operations of the cutting platform 104 in addition to the functionality of the electronic device 110 disclosed herein (e.g., the methods described herein with respect to FIGS. 4-7, etc.). In other implementations, the electronic device 110 is a discrete device from the controller of the cutting platform, for example the electronic device 110 may be a central server and/or other monitoring station (e.g., located at the site of the cutting platform 104, located remote from the site of the cutting platform 104, etc.) that is optionally communicatively coupled to the controller of the cutting platform 104 for communicating therewith, etc. Moreover, the electronic device 110 is a component of a cloud service (not shown) that is optionally communicatively coupled to the controller of the cutting platform 104 for communicating therewith.

The electronic device 110 may be configured to be communicatively coupled, whether directly or indirectly, to the force feedback sensor 108. For example, in some implementations the electronic device 110 is indirectly communicatively coupled to the force feedback sensor 108 through an electronic storage device (not shown in FIG. 1; e.g., a memory, etc.) that stores resistive force data measured by the force feedback sensor 108. The communicative coupling of the electronic device 110 to the force feedback sensor 108 and/or the electronic storage device that stores resistive force data measured by the force feedback sensor 108 can be wireless (e.g., over Wi-Fi, using Bluetooth®, etc.) and/or can be a wired connection. The communicative coupling of the electronic device 110 to the force feedback sensor 108 and/or the electronic storage device that stores resistive force data measured by the force feedback sensor 108 enables the electronic device 110 to receive resistive force data measured by the force feedback sensor 108.

In some implementations, the electronic device 110 is configured to be communicatively coupled, whether directly or indirectly, to the torque sensor 136. For example, in some implementations the electronic device 110 is indirectly communicatively coupled to the torque sensor 136 through an electronic storage device (not shown in FIG. 1; e.g., a memory, etc.) that stores torque data measured by the torque sensor 136. The communicative coupling of the electronic device 110 to the torque sensor 136 and/or the electronic storage device that stores torque data measured by the torque sensor 136 can be wireless (e.g., over Wi-Fi, using Bluetooth®, etc.) and/or can be a wired connection. The communicative coupling of the electronic device 110 to the torque sensor 136 and/or the electronic storage device that stores torque data measured by the torque sensor 136 enables the electronic device 110 to receive torque data measured by the torque sensor 136.

Some implementations, the electronic device 110 are configured to be communicatively coupled, whether directly or indirectly, to the camera 138. For example, in some implementations the electronic device 110 is indirectly communicatively coupled to the camera 138 through an electronic storage device (not shown in FIG. 1; e.g., a memory, etc.) that stores images obtained and/or determinations made by the camera 138. The communicative coupling of the electronic device 110 to the camera 138 and/or the electronic storage device that stores images and/or determinations of the camera 138 can be wireless (e.g., over Wi-Fi, using Bluetooth®, etc.) and/or can be a wired connection. The communicative coupling of the electronic device 110 to the camera 138 and/or the electronic storage device that stores images obtained and/or determinations made by the camera 138 enables the electronic device 110 to receive images obtained and/or determinations made by the camera 138. Optionally, the electronic device 110 is configured to be communicatively coupled, whether directly or indirectly, to the following mechanism 140, for example using a wireless (e.g., over Wi-Fi, using Bluetooth®, etc.) and/or a wired connection.

The electronic device 110 includes platform software comprising an operating system (OS) and/or any other suitable platform software to enable application software to be executed on the electronic device 110. For example, the electronic device 158 comprises software stored in memory and executed on a processor in some implementations. The electronic device 110 includes internal hardware, for example video (graphic) cards, sound cards, network cards, television tuners, radio tuners, processors (e.g., the processor 142, etc.), motherboards, memories (e.g., the memory 144, etc.), hard drives, media drives, batteries, power supplies, and/or the like.

In some implementations, the electronic device 110 comprises a trained regressor (e.g., a random decision forest, directed acyclic graph, support vector machine, neural network, other trained regressor, etc.). Examples of trained regressors include, but are not limited to, a convolutional neural network, a random decision forest, and/or the like. It should further be understood that the electronic device 110, in some implementations, operates according to machine learning principles and/or techniques known in the art without departing from the functionality and/or methods described herein. The electronic device 110 optionally makes use of training data pairs when applying machine learning techniques and/or algorithms (e.g., millions of training data pairs (or more) stored in a machine learning data structure, etc.). In some implementations, a training data pair includes an input or feedback data value paired with a criteria update value. For example, the pairing of the two values demonstrates a relationship between the input or feedback data value and the criteria update value that is used by the electronic device 110 to determine future criteria updates according to machine learning techniques and/or algorithms.

In some implementations, the electronic device 110 includes a Field-programmable Gate Array (FPGA) and/or a dedicated chip. For example, the functionality of the electronic device 110 is implemented, in whole or in part, by one or more hardware logic components in some implementations. Examples of types of hardware logic components include, but are not limited to, FPGAs, Application-specific Integrated Circuits (ASICs), Application-specific Standard Products (ASSPs), System-on-a-chip systems (SOCs), Complex Programmable Logic Devices (CPLDs), Graphics Processing Units (GPUs), and/or the like. In some implementations, the electronic device 110 includes external hardware, for example input devices (e.g., keyboards, trackpads, a mouse, microphones, cameras, drawing tablets, headsets, scanners, etc.), output devices (e.g., monitors, televisions, printers, speakers, fax machines, etc.), external hard drives, wireless routers, surge protectors, internet of things (IoT) devices, other peripherals, and/or the like.

As briefly described above, the electronic device 110 is configured to determine whether the cutting tool 106 has penetrated through a wall (e.g., the wall 112 of the container 102, etc.) using resistive force data received from the force feedback sensor 108. Accordingly, using real-time feedback provided by the force feedback sensor 108, the electronic device 110 is configured to dynamically evaluate each container individually as the particular container is being cut such that the cutter 118 of the cutting tool 106 can successfully cut (e.g., cut through the entire thickness of the container wall, etc.) the particular container, for example without damaging any items contained within the container. For example, the electronic device 110 and/or a discrete controller of the cutting platform can control (e.g., limit, etc.) the cutting depth of the cutter 118 such that the cutter 118 does not physically contact the item(s) contained within the container as the cut is being performed. The determination of whether the cutter 118 of the cutting tool 106 has penetrated through the container wall may enable the automated container cutting system 100 to cut a container that does not have a pre-existing (i.e., established, predetermined, etc.) programmed cutting depth, for example without damaging item(s) contained within the container. Moreover, the determination of whether the cutter 118 has penetrated through the container wall enables the system 100 to successfully cut containers that have been deformed (e.g., from handling, storage, etc.) from the original size and/or shape of the container, for example without damaging item(s) contained within the container (whether or not the a cutting depth has been programmed for the particular container being cut).

To determine whether the cutter 118 of the cutting tool 106 has penetrated through the wall of the container, the electronic device 110 receives the resistive force data obtained by the force feedback sensor 108. As described above, the resistive force data represents the resistive force exerted on the cutter 118 as the cutter 118 pierces the container wall. The electronic device 110 uses the received resistive force data to determine whether the cutter 118 has penetrated through the container wall. In some implementations, the electronic device 110 determines that the cutter 118 has penetrated through the container wall upon a reduction of the resistive force exerted on the cutter 118 as the cutter 118 pierces the container wall. For example, the resistive force exerted on the cutter 118 may decrease once the cutter 118 has pierced an interior side (e.g., the interior side 130 of the container wall 112, etc.). Accordingly, upon observing a decrease in the resistive force exerted on the cutter 118, the electronic device 110 may determine that the cutter 118 has pierced the interior side of the container wall and has thereby penetrated through the container wall. In some implementations, the electronic device 110 determines whether the cutter 118 has penetrated through the wall of the container by determining a force change point (e.g., the force change point 308 shown in FIG. 3, etc.) within a resistive force trace (e.g., the resistive force trace 300 shown in FIG. 3, etc.) of the resistive force data received from the force feedback sensor 108. For example, the force change point within the resistive force trace may indicate that the cutter 118 has pierced an interior side of the container wall. Of course, other methods of determining whether the cutter 118 has penetrated through the container wall using resistive force data from the force feedback sensor 108 are contemplated as being within the scope of the present disclosure.

In one example, and referring now to FIGS. 2 and 3, during a cutting operation the resistive force exerted on the cutter 118 increases as the cutter 118 moves into the position shown in FIG. 2*b* wherein the cutter 118 is in physical contact with, and applies force in the direction 126 to the exterior side 128 of the container wall 112, as shown by line 302 of the resistive force trace 300. The resistive force exerted on the cutter 118 peaks at point 304, which represent the point in time just prior to the cutter 118 piercing the exterior side 128. After piercing the exterior side 128 of the container wall 112, the resistive force exerted on the cutter 118 decreases as the cutter 118 moves through the thickness T of the container wall 112 toward the interior side 130 of the container wall 112, as illustrated by line 306 of the resistive force trace 300. Point 308 of the resistive force trace 300 represents the point in time just prior to the cutter 118 piercing the interior side 130 of the container wall 112. As shown by line 310 of the resistive force trace 300, the resistive force exerted on the cutter 118 decreases further, and at a faster rate, after the cutter 118 has pierced the interior side 130 of the container wall 112. Accordingly, upon observing the force change point 308 and following reduction line 310, the electronic device 110 can determine that the cutter 118 has pierced the interior side 130 of the container wall 112. Based on the determination that the cutter 118 has pierced the interior side 130 of the container wall 112, the electronic device 110 determines that the cutter 118 has penetrated through the container wall 112 (i.e., the cutter 118 has penetrated the entire thickness T of the container wall 112).

Referring now to FIGS. 1 and 2, as described above the determination of whether the cutter 118 of the cutting tool 106 has penetrated through the container wall may enable the automated container cutting system 100 to cut containers that do not have a pre-existing programmed cutting depth and/or have been deformed from the original size and/or shape of the container, for example without damaging item(s) contained within the container. For example, the determination of whether the cutter 118 has penetrated through the container wall 112 enables the electronic device 110 to confirm the depth of the cut and make real time (i.e., on the fly, etc.) cutting depth adjustments to a particular container being cut. Specifically, and in one example, upon determining that the cutter 118 has penetrated through the wall 112 of the container 102, the electronic device 110 limits (e.g., halt, stop, reduce, etc.) further movement of the cutter 118 toward the interior 134 of the container 102 (e.g., in the direction 126, etc.) to thereby limit the cutting depth of the cutter 118. In other words, the determination that the cutter 118 has penetrated through the container wall 112 indicates that a successful cut has been achieved. Accordingly, the electronic device 110 may prevent the cutter 118 from damaging item(s) contained within the interior 134 of the container 102 by preventing the cutter 118 from moving into physical contact with the item(s). The electronic device 110 may limit further movement of the cutter 118 toward the interior 134 by directly commanding the cutting platform 104 and/or by instructing a controller of the cutting platform to limit further movement of the cutter 118.

In another example, upon determining that the cutter 118 has not penetrated through the container wall 112, the electronic device 110 enables further movement of the cutter 118 toward the interior 134 of the container 102 (e.g., in the direction 126, etc.) to thereby increase the cutting depth of the cutter 118. The electronic device 110 enables further movement of the cutter 118 toward the interior 134 until the resistive force data received from the force feedback sensor 108 indicates that the cutter 118 has penetrated through the container wall 112 (e.g., indicates that the interior side 130 has been pierced as described above, etc.). Once the resistive force data received from the force feedback sensor 108 indicates that the cutter 118 has penetrated through the container wall 112, the electronic device 110 determines that a successful cut has been achieved and limits further movement of the cutter 118 toward the container interior 134. The electronic device 110 may enable further movement of the cutter 118 toward the interior 134 by: commanding (whether directly or indirectly through a controller of the cutting platform 104) the cutting platform 104 to continue movement of the cutter 118 toward the interior 134; allowing (e.g., not interfering with, not limiting, not stopping, etc.) movement of the cutter 118 toward the interior 134 to continue; and/or the like.

In some implementations, the electronic device 110 may establish and/or adjust a programmed cutting depth for the type of container that has been successfully cut based on the cutting depth used to achieve the successful cut. Moreover, in addition or alternative to using the received resistive force data as described above, some implementations of the electronic device 110 use torque data measured by the torque sensor 136 and/or one or more images obtained by the camera 138 to verify that a successful cut has been made through the container wall 112 (e.g., to verify that the interior side 130 has been pierced by the cutter 118 along an approximate entirety of the intended cutting path, to verify whether the cut opens the container 102 or enables the container 102 to be opened, etc.)

The received resistive force data is optionally used by the electronic device 110 to determine whether the cutter 118 moved into physical contact with one or more items contained within the interior 134 of the container 102 during the cutting operation (e.g., in real time, after the cut has been made, etc.). In other words, the received resistive force data may be used by the electronic device 110 to determine whether one or more items contained within the container interior 134 has been damaged by the cutter 118. For example, an increase in the resistive force exerted on the cutter 118 (e.g., as indicated by the line 314 and/or peak 316 of the resistive force trace 300 shown in FIG. 3, etc.) may indicate that the cutter 118 has physically contacted the item(s) after piercing the interior side 130. In addition or alternative to the received resistive force data, some implementations of the electronic device 110 use torque data measured by the torque sensor 136 and/or one or more images obtained by the camera 138 to determine whether the cutter 118 moved into physical contact with one or more items contained within the interior 134 of the container 102 during the cutting operation. For example, an increase in the torque data measured by the torque sensor 136 may indicate that the cutter 118 has moved into physical contact with one or more items contained within the interior 134 of the container 102.

As described above, the automated container cutting system 100 may include the following mechanism 140. The following mechanism 140 facilitates maintaining engagement of the cutter 118 in physical contact with the container wall 112 as the cutter 118 moves along the intended cutting path (e.g., as the cutter 118 moves along a container wall that has been deformed from its original size and/or shape, etc.). In some implementations, the following mechanism 140 is biased in a direction toward the container wall 112 (e.g., the direction 126, etc.) such that the following mechanism 140 automatically maintains engagement of the cutter 118 in physical contact with the container wall 112. In addition or alternatively, the electronic device 110 may be configured to recognize that the cutter 118 has disengaged from (i.e., deviated from the surface of) the container wall 112 using the received resistive force data, the received torque data, and/or images obtained by the camera 138. For example, the resistive force and/or the torque exerted on the cutter 118 may decrease when the cutter 118 disengages from the container wall 112 during a cut. Upon recognizing that the cutter 118 has disengaged from the container wall 112, the electronic device 110 may command (whether directly or indirectly through a controller of the cutting platform 104) the following mechanism 140 to move in a direction toward the container wall 112 (e.g., the direction 126, etc.) to re-engage in physical contact with the container wall 112.

The torque data measured by the torque sensor 136 may enable the electronic device 110 to determine a dullness of the cutter 118. For example, the electronic device 110 may compare the received torque data to historical torque data (e.g., for one or more types of container, etc.) of the cutter 118 and/or expected torque data that is based on the manufactured sharpness of the cutter 118. The electronic device 110 may use an increase of torque within the received torque data as compared to the historical and/or expected torque data to determine that the cutter 118 has become dull (e.g., is below a predetermined sharpness, etc.) and may need to be sharpened, replaced, and/or the like. In some implementations, the received torque data may be used by the electronic device 110 to project a future expected sharpness, a maintenance schedule (e.g., a future sharpening date, etc.) and/or a life span (e.g., a future replacement date, etc.) of the cutter 118.

As briefly described above, some implementations of the electronic device 110 are configured to track (e.g., determine, observe, record, store, etc.) the results of cuts to a plurality of containers of the same type and establish and/or adjust a programmed cutting depth of the cutting tool 106 for the particular type of container based on the tracked results. For example, the electronic device 110 is configured to learn (e.g., using machine learning techniques, etc.) what the appropriate cutting depth is for a particular type of container based on previous cuts performed by the automated container cutting system 100 on containers of the same type. The electronic device 110 can thus automatically establish a programmed cutting depth for container types that do not have existing programmed cutting depths, which may increase the efficiency and/or lower the operational costs of the automated container cutting system 100 (e.g., as compared to manually determining the appropriate cutting depth for a container type, etc.). Moreover, the electronic device 110 is configured to automatically adjust the programmed cutting depths of container types having established (i.e., existing) programmed cutting depths, which may increase the efficiency and/or lower the operational costs of the automated container cutting system 100 (e.g., as compared to manually determining that an established programmed cutting depth requires adjustment and manually performing the adjustment, etc.).

In some implementations, the electronic device 110 is configured to track the results of cuts to a plurality of containers of the same type by recording one or more failed cuts and/or recording one or more over cuts. As used herein, a "failed cut" includes cuts that have not penetrated through the container wall (i.e., have only cut through a portion of the thickness T of the container wall 112), that do not open the container, that do not enable the container to be opened, and/or the like. A used herein, an "over cut" includes cuts wherein the cutter 118 has moved into physical contact with one or more items contained within the interior of the container, cuts wherein the cutter 118 has moved an unnecessary distance past the interior side of the container wall without physically contacting any items contained within the container interior, and/or the like. Failed cuts and/or over cuts may be tracked by the electronic device 110 using any information, such as, but not limited to, using resistive force data measured by the force feedback sensor 108, using torque data measured by the torque sensor 136, using one or more images obtained by the camera 138, using observation by a human operator, and/or the like.

As described above, the electronic device 110 may adjust the programmed cutting depth of the cutting tool 106 for a container type based on the tracked cut results of the container type. In one example, the electronic device 110 increases an established programmed cutting depth for the type of the container 102 based on the recorded cut results including one or more failed cuts of a container 102. The increased cutting depth causes the cutter 118 to move farther toward the interior 134 of the container 102 (e.g., in the direction 126, etc.) during future cutting operations such that the cutter 118 to penetrates through the container wall 112 of subsequent containers 102 of the same type. The value of the increase to the programmed cutting depth selected by the electronic device 110 may depend, for example, on the number, severity (e.g., distance of the bottom of a failed cut from the interior side 130, etc.), and/or the like of the failed cut(s).

In another example, the electronic device 110 decreases an established programmed cutting depth for the type of the container 102 based on the recorded cut results including one or more over cuts of a container 102. The decreased cutting depth causes the cutter 118 to move a shorter distance toward the interior 134 of the container 102 (e.g., in the direction 126, etc.) during future cutting operations such that the cutter 118 is less likely to physically contact item(s) contained within subsequently cut containers 102 of the same type. Accordingly, the decreased cutting depth may reduce or eliminate the occurrence of the cutter 118 damaging item(s) contained within subsequently cut containers 102 of the same type. The value of the decrease to the programmed cutting depth selected by the electronic device 110 may depend, for example, on the number, severity (e.g., distance of the cutter tip 132 past the interior side 130 in an overcut, etc.), and/or the like of the over cut(s).

As also described above, the electronic device 110 may be configured to establish a programmed cutting depth for a container type that does not have an existing programmed cutting depth. In one example, the electronic device 110 establishes (e.g., generates, calculates, determines, etc.) a programmed cutting depth for the type of the container 102 based on the recorded cut results including one or more failed cuts of a container 102 and/or one or more over cuts of a container 102. For example, the electronic device 110 may analyze the recorded cut results for the type of the container 102 and select a value (or range of values) for the cutting depth based on the number, severity (e.g., distance of the bottom of a failed cut from the interior side 130, distance of the cutter tip 132 past the interior side 130 in an overcut, etc.), and/or the like of failed cuts and/or over cuts.

In addition or alternative to tracking the results of cuts to a plurality of containers of the same type, the electronic device 110 may be configured to store cutting depth data of a vendor and/or a container source for use establishing and/or adjusting programmed cutting depths of the cutting tool 106. For example, data relating to a known vendor may be stored to enable the electronic device 110 to fine tune the cutting depth of the cutter 118 for one or more types of containers of the vendor. The stored data relating known vendors may include, but is not limited to: the results of previous cuts performed by the automated container cutting system 100 on containers of the vendor (e.g., failed cuts, over cuts, etc.); the size, shape, wall thickness, other geometry, and/or material composition of one or more container types of the vendor; and/or the like.

In another example, data relating to a source of one or more container types may be stored to enable the electronic device 110 to fine tune the cutting depth of the cutter 118 for one or more types of containers of the source. The stored data relating a container source may include, but is not limited to: the results of previous cuts performed by the automated container cutting system 100 on containers of the source (e.g., failed cuts, over cuts, etc.); the size, shape, wall thickness, other geometry, and/or material composition of one or more container types of the source; and/or the like. In some implementations, storing data relating vendors and/or container sources may enable the automated container cutting system 100 to achieve successful cuts to a new container type during an initial cutting run of the new container type. In other words, the stored data relating to vendors and/or container sources may enable the system 100 to achieve a good first cut to a never before seen container and/or product.

Figure 4:
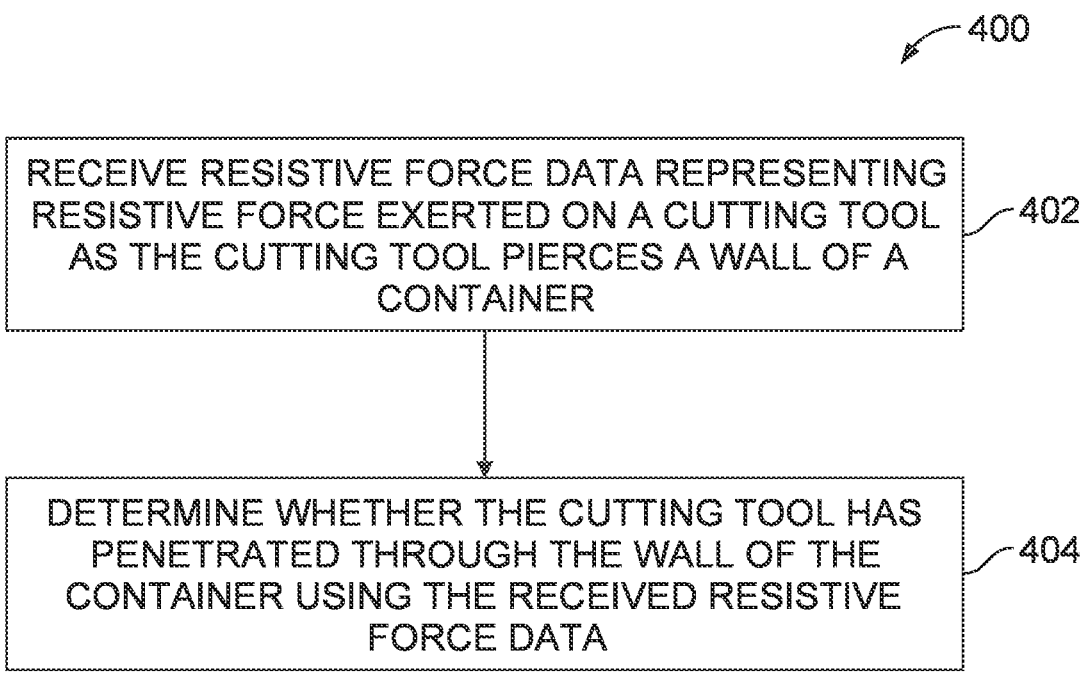
FIG. 4 is a flow chart illustrating a method for automated cutting of a container according to an implementation.

FIG. 4 illustrates a flow chart of a method 400 for automated cutting of a container (e.g., the container 102 shown in FIGS. 1 and 2, etc.) according to an implementation. The method 400 is performed by one or more electronic devices (e.g., the electronic device 110 shown in FIG. 1, the electronic device 802 shown in FIG. 8, etc.).

The method 400 includes receiving, at 402, resistive force data representing resistive force exerted on a cutting tool (e.g., the cutting tool 106 shown in FIGS. 1 and 2, etc.) as the cutting tool pierces a wall (e.g., the wall 112 shown in FIGS. 1 and 2, etc.) of the container. At 404, the method 400 includes determining whether the cutting tool has penetrated through the wall of the container using the received resistive force data.

Figure 5:
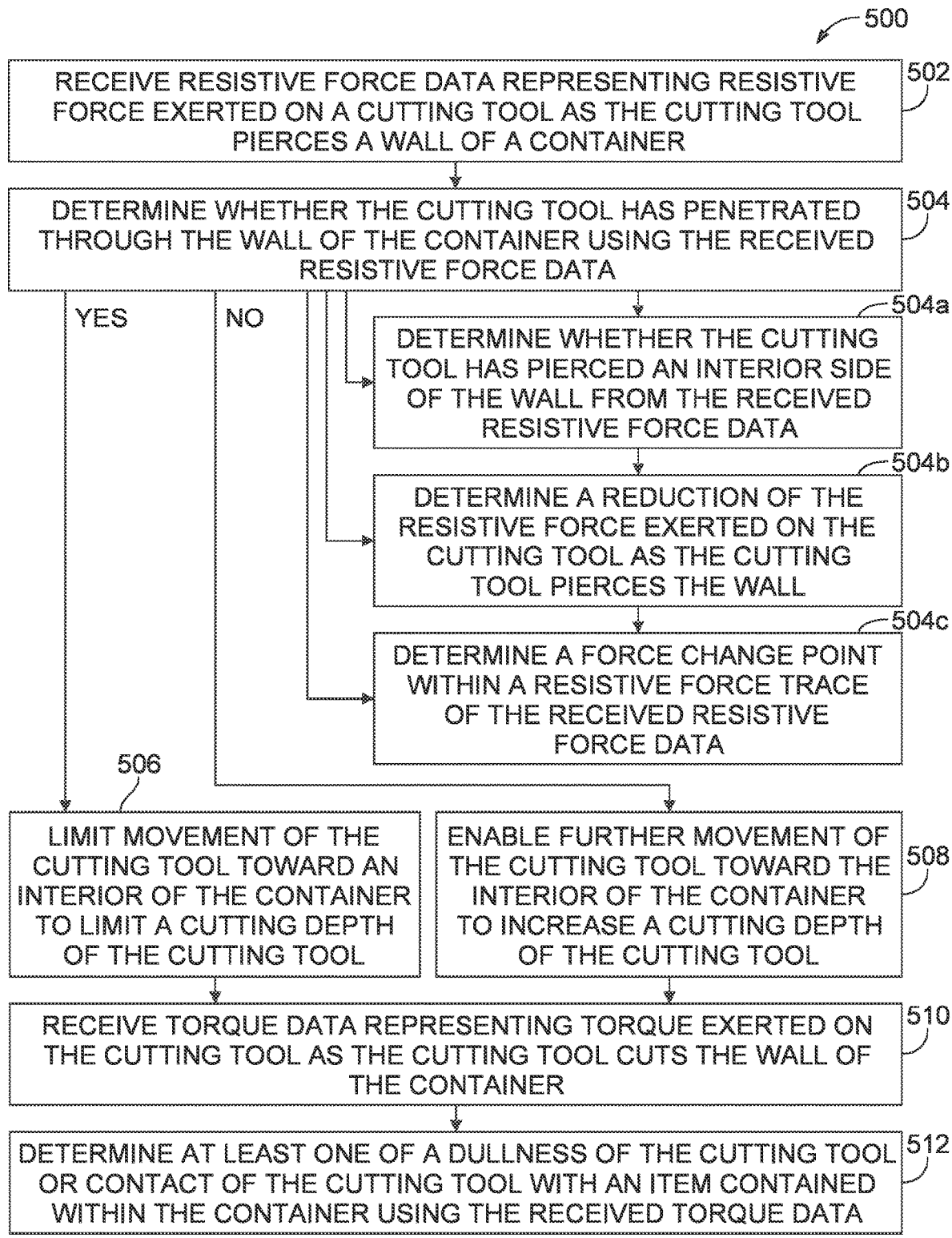
FIG. 5 is a flow chart illustrating another method for automated cutting of a container according to an implementation.

FIG. 5 illustrates another flow chart of a method 500 for automated cutting of a container (e.g., the container 102 shown in FIGS. 1 and 2, etc.) according to an implementation. The method 500 is performed by one or more electronic devices (e.g., the electronic device 110 shown in FIG. 1, the electronic device 802 shown in FIG. 8, etc.).

The method 500 includes receiving, at 502, resistive force data representing resistive force exerted on a cutting tool (e.g., the cutting tool 106 shown in FIGS. 1 and 2, etc.) as the cutting tool pierces a wall (e.g., the wall 112 shown in FIGS. 1 and 2, etc.) of the container. At 504, the method 500 includes determining whether the cutting tool has penetrated through the wall of the container using the received resistive force data.

In some implementations, determining at 504 whether the cutting tool has penetrated through the wall of the container using the received resistive force data includes determining, at 504*a*, whether the cutting tool has pierced an interior side (e.g., the interior side 130 shown in FIG. 2, etc.) of the wall from the received resistive force data. Moreover, determining at 504 whether the cutting tool has penetrated through the wall of the container using the received resistive force data optionally includes determining, at 504*b*, a reduction of the resistive force exerted on the cutting tool as the cutting tool pierces the wall. Further, in some implementations determining at 504 whether the cutting tool has penetrated through the wall of the container using the received resistive force data includes determining, at 504*c*, a force change point (e.g., the force change point 308, etc.) within a resistive force trace (e.g., the resistive force trace 300 shown in FIG. 3, etc.) of the received resistive force data. Determining at 504 whether the cutting tool has penetrated through the wall of the container using the received resistive force data may include performing a combination of some or all of operations 504*a*, 504*b*, and 504*c* in some implementations.

If it is determined at 504 that the cutting tool has penetrated through the wall of the container, the method 500 may include limiting, at 506, movement of the cutting tool toward an interior (e.g., the interior 134 shown in FIGS. 2 and 3, etc.) of the container to limit a cutting depth of the cutting tool. In other words, some implementations of the method 500 include limiting at 506 movement of the cutting tool toward the interior of the container to limit a cutting depth of the cutting tool upon determining at 504 that the cutting tool has penetrated through the wall of the container.

If it is determined at 504 that the cutting tool has not penetrated through the wall of the container, the method 500 may include enabling, at 508, further movement of the cutting tool toward the interior of the container to increase a cutting depth of the cutting tool. In other words, some implementations of the method 500 include enabling at 508 further movement of the cutting tool toward the interior of the container to increase a cutting depth of the cutting tool upon determining at 504 that the cutting tool has not penetrated through the wall of the container.

The method 500 optionally includes receiving, at 510, torque data representing torque exerted on the cutting tool as the cutting tool cuts the wall of the container. At 512, the method 500 may include determining at least one of a dullness of the cutting tool or contact of the cutting tool with an item contained within the container using the received torque data.

Figure 6:
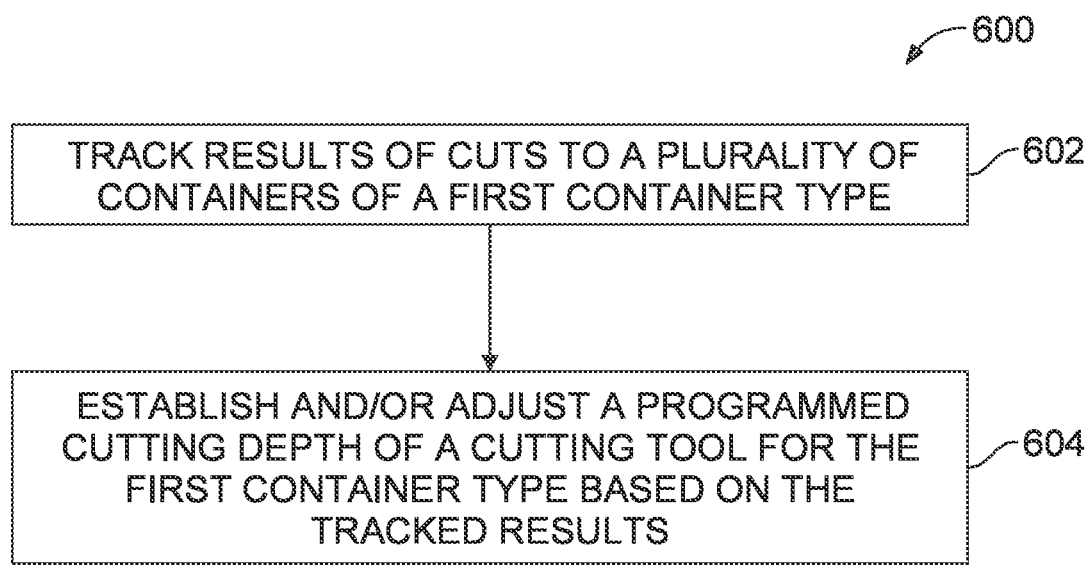
FIG. 6 is a flow chart illustrating another method for automated cutting of a container according to an implementation.

FIG. 6 illustrates another flow chart of a method 600 for automated cutting of a container (e.g., the container 102 shown in FIGS. 1 and 2, etc.) according to an implementation. The method 600 is performed by one or more electronic devices (e.g., the electronic device 110 shown in FIG. 1, the electronic device 802 shown in FIG. 8, etc.).

The method 600 includes tracking, at 602, results of cuts to a plurality of containers of a first container type. At 604, the method 600 includes establishing and/or adjusting a programmed cutting depth of a cutting tool (e.g., the cutting tool 106 shown in FIGS. 1 and 2, etc.) for the first container type based on the tracked results.

Figure 7:
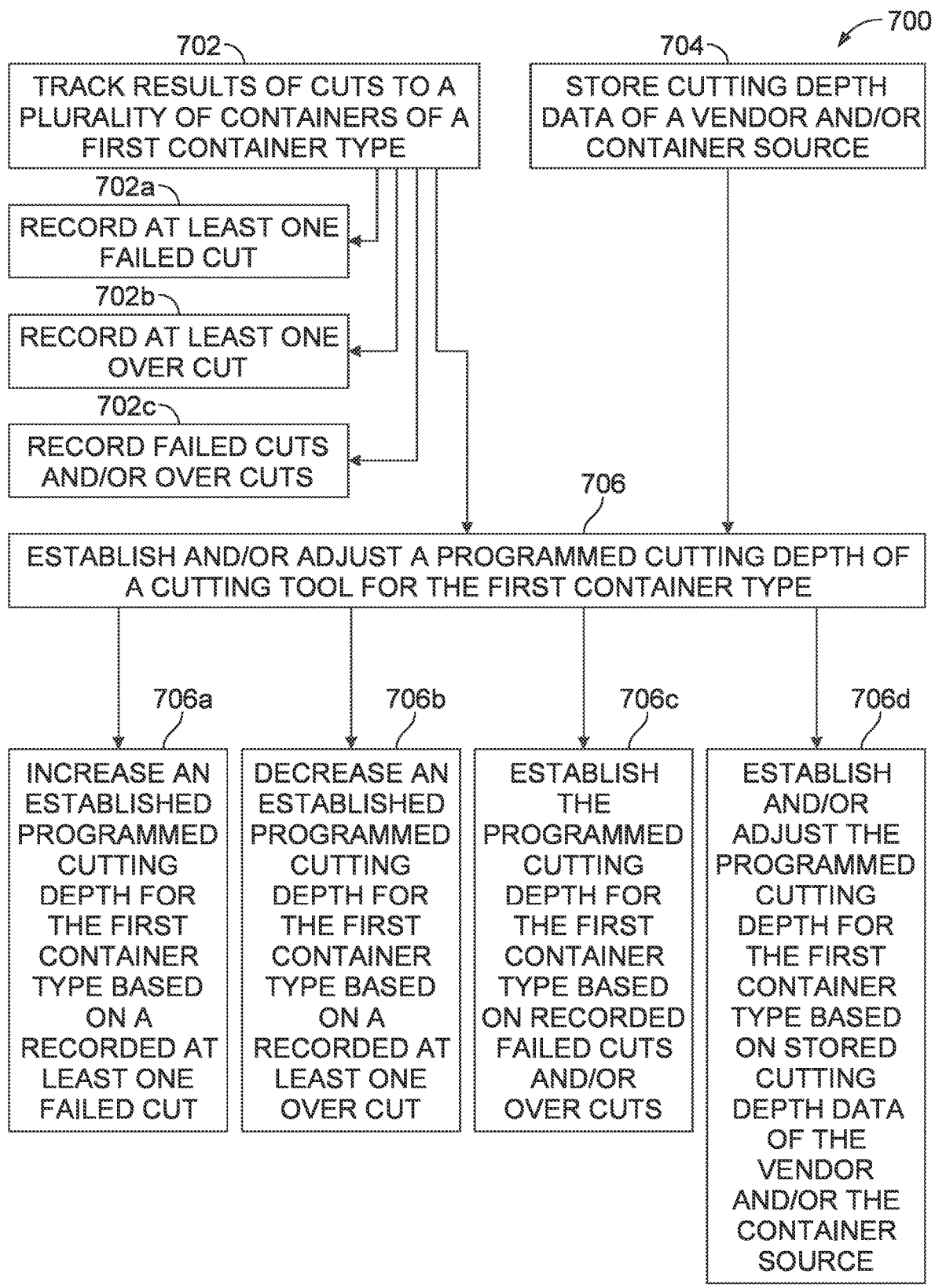
FIG. 7 is a flow chart illustrating another method for automated cutting of a container according to an implementation.

FIG. 7 illustrates another flow chart of a method 700 for automated cutting of a container (e.g., the container 102 shown in FIGS. 1 and 2, etc.) according to an implementation. The method 700 is performed by one or more electronic devices (e.g., the electronic device 110 shown in FIG. 1, the electronic device 802 shown in FIG. 8, etc.).

The method 700 includes tracking, at 702, results of cuts to a plurality of containers of a first container type. Tracking at 702 the results of cuts to the plurality of containers of the first container type may include recording, at 702*a* at least one failed cut. Moreover, tracking at 702 the results of cuts to the plurality of containers of the first container type may include recording, at 702*b*, at least one over cut. Further, tracking at 702 the results of cuts to the plurality of containers of the first container type may include recording, at 702*c*, failed cuts and/or over cuts.

In addition, or alternative to tracking at 702 the results of cuts to the plurality of containers of the first container type, the method 700 optionally includes storing, at 704, cutting depth data of a vendor and/or a container source.

At 706, the method 700 includes establishing and/or adjusting a programmed cutting depth of a cutting tool for the first container type, for example based on the tracked results. Establishing and/or adjusting at 706 the programmed cutting depth may include increasing, at 706*a*, an established programmed cutting depth for the first container type based on a recorded at least one failed cut. In some examples, establishing and/or adjusting at 706 the programmed cutting depth includes decreasing, at 706*b*, an established programmed cutting depth for the first container type based on a recorded at least one over cut. Moreover, establishing and/or adjusting at 706 the programmed cutting depth may include establishing, at 706*c*, the programmed cutting depth for the first container type based on recorded failed cuts and/or over cuts. In some implementations, establishing and/or adjusting at 706 the programmed cutting depth includes establishing and/or adjusting, at 706*d*, the programmed cutting depth for the first container type based on the stored cutting depth data of the vendor and/or the container source.

Exemplary Operating Environment

Figure 8:
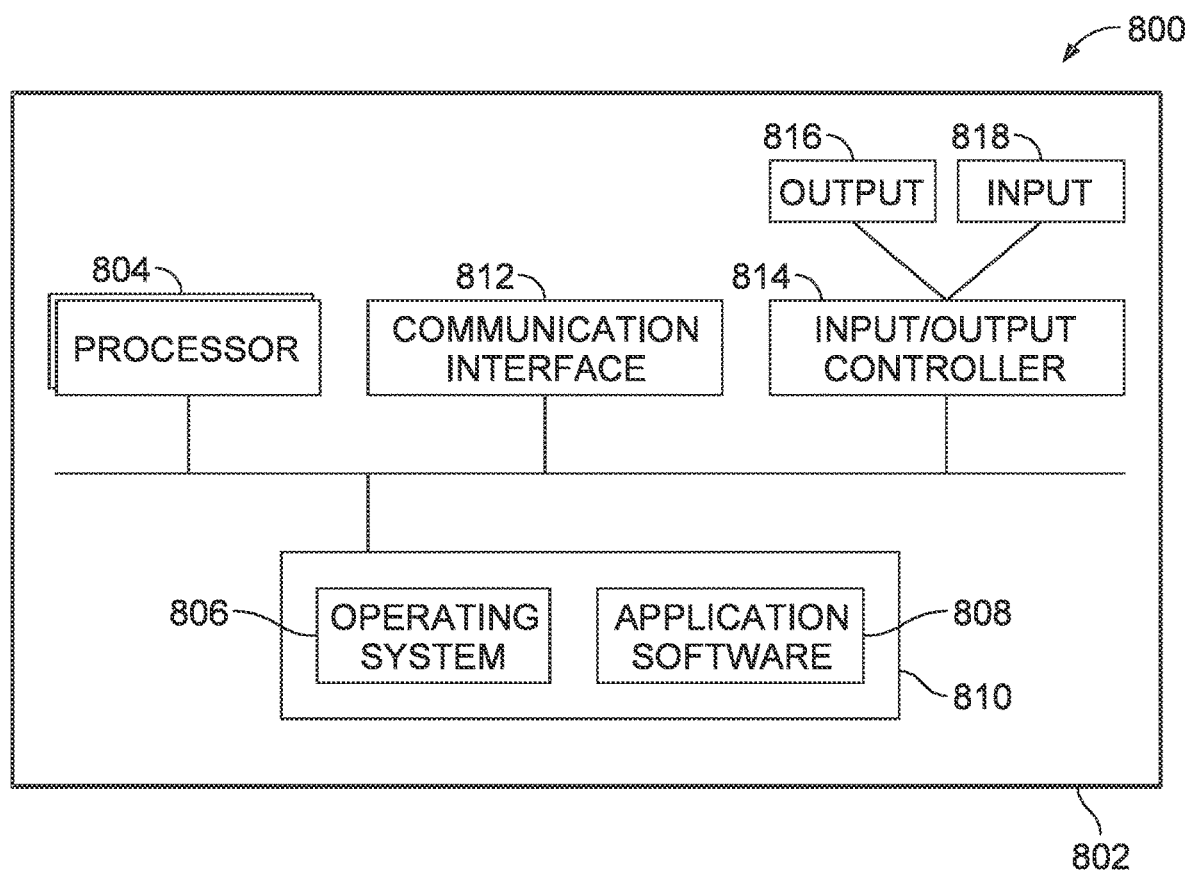
FIG. 8 illustrates an electronic device according to an implementation as a functional block diagram.

The present disclosure is operable with an electronic device (i.e., a computing apparatus) according to an implementation as a functional block diagram 800 in FIG. 8. In an implementation, components of a computing apparatus 802 are implemented as a part of an electronic device according to one or more implementations described in this specification. The computing apparatus 802 comprises one or more processors 804, for example microprocessors, controllers, and/or any other suitable type of processors for processing computer executable instructions to control the operation of the electronic device. In some implementations, platform software comprising an operating system 806 and/or any other suitable platform software is provided on the apparatus 802 to enable application software 808 to be executed on the device.

Computer executable instructions are provided using any computer-readable media that are accessible by the computing apparatus 802. Computer-readable media include, for example and without limitation, computer storage media such as a memory 810 and communications media. Computer storage media, such as a memory 810, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media embody computer readable instructions, data structures, program modules, and/or the like in a modulated data signal, such as a carrier wave and/or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 810) is shown within the computing apparatus 802, it will be appreciated by a person skilled in the art, that in some implementations the storage is distributed or located remotely and accessed via a network or other communication link (e.g. using a communication interface 812).

In some implementations, the computing apparatus 802 comprises an input/output controller 814 configured to output information to one or more output devices 816, for example a display and/or a speaker, which is separate from or integral to the electronic device. The input/output controller 814 is also configured, in some implementations, to receive and process an input from one or more input devices 818, for example, a keyboard, a microphone, and/or a touchpad. In one implementation, the output device 816 also acts as the input device. An example of such a device is a touch sensitive display. In some implementations, the input/output controller 814 also outputs data to devices other than the output device, e.g. a locally connected printing device. In some implementations, a user provides input to the input device(s) 818 and/or receives output from the output device(s) 816.

In some implementations, the functionality described herein is performed, at least in part, by one or more hardware logic components. According to an implementation, the computing apparatus 802 is configured by the program code when executed by the processor 804 to execute the implementations of the operations and functionality described. Alternatively, or in addition, the functionality described herein is performed, at least in part, by one or more hardware logic components. For example, and without limitation, illustrative types of hardware logic components include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs), and/or the like.

Although some of the present embodiments are described and illustrated as being implemented in a server, controller, cloud service, smartphone, mobile phone, personal computer, and/or tablet computer, these are only examples of a device and not a limitation. As those skilled in the art will appreciate, the present implementations are suitable for application in a wide variety of different types of devices, such as portable and mobile devices, for example, in laptop computers, tablet computers, etc.

At least a portion of the functionality of the various elements in the figures can be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, and/or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, microprocessor-based systems, set top boxes, programmable consumer electronics, mobile telephones, mobile computing and/or communication devices, network PCs, minicomputers, mainframe computers, controllers, distributed computing environments that include any of the above systems and/or devices, and/or the like. Such systems and/or devices can accept input from the user in any way, including from input devices such as a keyboard or pointing device, via gesture input, proximity input (for example by hovering), and/or via voice input.

Implementations of the disclosure may be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects and implementations of the disclosure can be implemented with any number and organization of such components or modules. For example, aspects and implementations of the disclosure are not limited to the specific computer-executable instructions or the specific components or modules illustrated in the figures and described herein. Other examples of the disclosure can include different computer-executable instructions and/or components having more or less functionality than illustrated and described herein.

In examples involving a general-purpose computer, aspects and implementations of the disclosure transform the general-purpose computer into a special-purpose computing device when configured to execute the instructions described herein.

The examples and implementations illustrated and/or described herein as well as examples and implementations not specifically described herein but within the scope of aspects and implementations of the disclosure constitute exemplary means for automatically determining whether a cutting tool has penetrated through a wall of a container, for automatically establishing and/or adjusting a programmed cutting depth of a cutting tool based on tracked results, and/or the like. For example, the elements illustrated in FIG. 1, such as when encoded to perform the operations illustrated in FIGS. 4-7, constitute exemplary means for automatically determining whether a cutting tool has penetrated through a wall of a container, for automatically establishing and/or adjusting a programmed cutting depth of a cutting tool based on tracked results, etc.

The following clauses describe further aspects:

Clause Set A:

A1. An automated container cutting system for cutting a container, the automated container cutting system comprising:
    a cutting platform;
    a cutting tool held by the cutting platform, the cutting tool being configured to cut the container;
    a force feedback sensor operatively connected to the cutting tool such that the force feedback sensor is configured to measure resistive force exerted on the cutting tool; and
    at least one processor communicatively coupled to the force feedback sensor, the processor configured to:
        receive resistive force data from the force feedback sensor, the resistive force data representing resistive force exerted on the cutting tool as the cutting tool pierces a wall of the container; and
        determine whether the cutting tool has penetrated through the wall of the container using the received resistive force data.

A2. The automated container cutting system of clause A1, wherein the at least one processor is configured to determine whether the cutting tool has penetrated through the wall of the container by determining whether the cutting tool has pierced an interior side of the wall from the received resistive force data.

A3. The automated container cutting system of clause A1, wherein the at least one processor is configured to determine that the cutting tool has penetrated through the wall of the container upon a reduction of the resistive force exerted on the cutting tool as the cutting tool pierces the wall.

A4. The automated container cutting system of clause A1, wherein the at least one processor is configured to determine whether the cutting tool has penetrated through the wall of the container by determining a force change point within a resistive force trace of the received resistive force data.

A5. The automated container cutting system of clause A1, wherein the at least one processor is configured to limit movement of the cutting tool toward an interior of the container to limit a cutting depth of the cutting tool upon determining that the cutting tool has penetrated through the wall of the container.

A6. The automated container cutting system of clause A1, wherein the at least one processor is configured to enable further movement of the cutting tool toward an interior of the container to increase a cutting depth of the cutting tool upon determining that the cutting tool has not penetrated through the wall of the container.

A7. The automated container cutting system of clause A1, wherein the container is a first type of container, the at least one processor configured to track cuts to a plurality of containers of the first type and establish and/or adjust a programmed cutting depth of the cutting tool for the first type of container based on the tracked cuts.

A8. The automated container cutting system of clause A1, further comprising a torque sensor operatively connected to the cutting tool such that the torque sensor is configured to measure torque exerted on the cutting tool, wherein the at least one processor is configured to:
  receive torque data from the torque sensor, the torque data representing torque exerted on the cutting tool as the cutting tool cuts the wall of the container; and
  determine at least one of a dullness of the cutting tool or contact of the cutting tool with an item contained within the container using the received torque data.

A9. The automated container cutting system of clause A1, wherein the cutting tool comprises a blade.

A10. The automated container cutting system of clause A1, wherein the cutting platform comprises an articulated robot arm.

Clause Set B:

B1. A computer implemented method for automated cutting of containers, the method comprising implementing, by at least one processor, the following operations:
  tracking results of cuts to a plurality of containers of a first container type; and
  establishing and/or adjusting a programmed cutting depth of a cutting tool for the first container type based on the tracked results.

B2. The method of clause B1, wherein tracking the results of cuts to the plurality of containers of the first container type comprises recording at least one failed cut, and wherein establishing and/or adjusting the programmed cutting depth comprises increasing an established programmed cutting depth for the first container type based on the recorded at least one failed cut.

B3. The method of clause B1, wherein tracking the results of cuts to the plurality of containers of the first container type comprises recording at least one over cut, and wherein establishing and/or adjusting the programmed cutting depth comprises decreasing an established programmed cutting depth for the first container type based on the recorded at least one over cut.

B4. The method of clause B1, wherein tracking the results of cuts to the plurality of containers of the first container type comprises recording failed cuts and/or over cuts, and wherein establishing and/or adjusting the programmed cutting depth comprises establishing the programmed cutting depth for the first container type based on the recorded failed cuts and/or over cuts.

B5. The method of clause B1, further comprising storing cutting depth data of a vendor and/or a container source, wherein establishing and/or adjusting the programmed cutting depth comprises establishing and/or adjusting the programmed cutting depth for the first container type based on the stored cutting depth data of the vendor and/or the container source.

Clause Set C:

C1. Apparatus for cutting a container, the apparatus comprising:
  a cutting platform;
  a cutting tool held by the cutting platform, the cutting tool being configured to cut the container; and
  a force feedback sensor operatively connected to the cutting tool such that the force feedback sensor is configured to measure resistive force exerted on the cutting tool, the force feedback sensor being configured to be communicatively coupled to a processor, wherein the processor receives resistive force data from the force feedback sensor that represents resistive force exerted on the cutting tool as the cutting tool pierces a wall of the container and determines whether the cutting tool has penetrated through the wall of the container using the received resistive force data.

C2. The apparatus of clause C1, wherein the processor determines whether the cutting tool has penetrated through the wall of the container by at least one of:
  determining whether the cutting tool has pierced an interior side of the wall from the received resistive force data;
  determining a reduction of the resistive force exerted on the cutting tool as the cutting tool pierces the wall; or
  determining a force change point within a resistive force trace of the received resistive force data.

C3. The apparatus of clause C1, wherein the processor limits movement of the cutting tool toward an interior of the container to limit a cutting depth of the cutting tool upon determining that the cutting tool has penetrated through the wall of the container.

C4. The apparatus of clause C1, wherein the processor enables further movement of the cutting tool toward an interior of the container to increase a cutting depth of the cutting tool upon determining that the cutting tool has not penetrated through the wall of the container.

C5. The apparatus of clause C1, further comprising a torque sensor operatively connected to the cutting tool such that the torque sensor is configured to measure torque exerted on the cutting tool, wherein the processor receives torque data from the torque sensor that represents torque exerted on the cutting tool as the cutting tool cuts the wall of the container and determines at least one of a dullness of the cutting tool or contact of the cutting tool with an item contained within the container using the received torque data.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or device value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one implementation or can relate to several implementations. The implementations are not limited to those that solve any or all of the stated problems or those that have any or all of the stated benefits and advantages.

In some examples, the operations illustrated in the figures can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

The order of execution or performance of the operations in examples and implementations of the disclosure illustrated and described herein is not essential, unless otherwise specified. That is, the operations can be performed in any order, unless otherwise specified, and examples and implementations of the disclosure can include additional or fewer operations than those disclosed herein. For example, it is contemplated that executing or performing a particular operation before, contemporaneously with, or after another operation is within the scope of aspects of the disclosure.

The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Further, references to "one embodiment" or "one implementation" are not intended to be interpreted as excluding the existence of additional embodiments or implementations that also incorporate the recited features. The indefinite articles "a", "an", "the", and "said" as used in the specification and in the claims, unless clearly indicated to the contrary, should be understood to mean "at least one." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects and implementations of the disclosure in detail, it will be apparent that modifications and variations are possible without departing from the scope of aspects and implementations of the disclosure as defined in the appended claims. As various changes could be made in the above constructions, products, and methods without departing from the scope of aspects and implementations of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein."Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for automated container cutting, the system comprising:
   a cutting tool configured to cut a container;
   a force feedback sensor operatively connected to the cutting tool, the force feedback sensor configured to measure resistive force exerted on the cutting tool; and
   a processor communicatively coupled to the force feedback sensor, the processor configured to:
      receive resistive force data from the force feedback sensor; and
      determine whether the cutting tool has penetrated through a wall of the container using the received resistive force data.

2. The system of claim 1, wherein the resistive force data represents resistive force exerted on the cutting tool as the cutting tool pierces the wall of the container.

3. The system of claim 1, wherein the processor is configured to determine that the cutting tool has penetrated through the wall of the container upon a reduction of the resistive force exerted on the cutting tool, wherein the reduction of the resistive force represents the cutting tool piercing the wall.

4. The system of claim 1, wherein the processor is configured to determine whether the cutting tool has penetrated through the wall of the container by determining a force change point within a resistive force trace of the received resistive force data.

5. The system of claim 1, wherein based on a determination of the processor that the cutting tool has penetrated through the wall of the container, movement of the cutting tool toward an interior of the container is controlled to limit a cutting depth of the cutting tool.

6. The system of claim 1, wherein based on a determination of the processor that the cutting tool has not penetrated through the wall of the container, further movement of the cutting tool toward an interior of the container is controlled to increase a cutting depth of the cutting tool.

7. The system of claim 1, wherein the container is a first type of container, the processor configured to track cuts to a plurality of containers of the first type and establish and/or adjust a programmed cutting depth of the cutting tool for the first type of container based on the tracked cuts.

8. The system of claim 1, further comprising:
   a torque sensor operatively connected to the cutting tool, the torque sensor configured to measure torque exerted on the cutting tool.

9. The system of claim 8, wherein the processor is further configured to:
   receive torque data from the torque sensor, the torque data representing torque exerted on the cutting tool as the cutting tool cuts the wall of the container; and
   determine at least one of a dullness of the cutting tool or contact of the cutting tool with an item contained within the container using the received torque data.

10. The system of claim 1, further comprising:
    a cutting platform, wherein the cutting platform comprises an articulated robot arm.

11. A computer-implemented method for automated cutting of containers, the computer-implemented method comprising implementing, by a processor, the following operations:
    tracking results of cuts to a plurality of containers of a first container type; and
    establishing a programmed cutting depth of a cutting tool for the first container type based on the tracked results.

12. The computer-implemented method of claim 11, further comprising implementing, by the processor, the following operations:
    tracking other results of cuts to another plurality of containers of a second container type; and
    adjusting a programmed cutting depth of the cutting tool for the second container type based on the other tracked results.

13. The method of claim 12, wherein tracking the other results of cuts to another plurality of containers of the second container type comprises recording at least one of a failed cut and/or an over cut, and wherein adjusting the programmed cutting depth for the second container type comprises at least one of increasing the cutting depth for the second container type based on a recorded failed cut and/or decreasing the cutting depth for the second container type based on a recorded over cut to adjust the programmed cutting depth for the second container type.

14. The method of claim 12, further comprising storing cutting depth data of a container source for the second container type as the programmed cutting depth, wherein adjusting the programmed cutting depth comprises adjusting the stored cutting depth data of the container source based on the tracked cuts.

15. The computer-implemented method of claim 11, wherein tracking the results of the cuts to the plurality of containers of the first container type comprises recording at least one of a failed cut or an over cut, and wherein establishing the programmed cutting depth comprises at least one of increasing the cutting depth for the first container type based on a recorded failed cut or decreasing the cutting depth for the first container type based on a recorded over cut to establish the programmed cutting depth for the first container type.

16. An apparatus for automated container cutting, the apparatus comprising:
    a cutting tool configured to cut a container; and
    a force feedback sensor operatively connected to the cutting tool, the force feedback sensor configured to measure resistive force exerted on the cutting tool, the force feedback sensor communicatively coupled to a processor, wherein the processor receives resistive force data from the force feedback sensor that represents resistive force exerted on the cutting tool as the cutting tool pierces a wall of the container and determines whether the cutting tool has penetrated through the wall of the container using the received resistive force data.

17. The apparatus of claim 16, wherein the resistive force data of the force feedback sensor is used by the processor to:
    determine a reduction of the resistive force exerted on the cutting tool as the cutting tool pierces the wall; or
    determine a force change point within a resistive force trace of the received resistive force data.

18. The apparatus of claim 16, wherein movement of the cutting tool is controlled toward an interior of the container to limit a cutting depth of the cutting tool responsive to a determination that the cutting tool has penetrated through the wall of the container.

19. The apparatus of claim 16, wherein movement of the cutting tool toward an interior of the container to increase a cutting depth of the cutting tool is controlled responsive to a determination that the cutting tool has not penetrated through the wall of the container.

20. The apparatus of claim 16, further comprising:
a torque sensor operatively connected to the cutting tool, the torque sensor configured to measure torque exerted on the cutting tool, wherein the processor receives torque data from the torque sensor that represents torque exerted on the cutting tool as the cutting tool cuts the wall of the container and determines at least one of a dullness of the cutting tool or contact of the cutting tool with an item contained within the container using the received torque data.

* * * * *